(12) United States Patent
Kountouris et al.

(10) Patent No.: US 10,931,444 B2
(45) Date of Patent: Feb. 23, 2021

(54) KEY SELECTION METHOD FOR CRYPTOGRAPHIC DATA PROCESSING

(71) Applicant: Orange, Paris (FR)

(72) Inventors: Apostolos Kountouris, Grenoble (FR); Francis Klay, Lannion (FR); Giyyarpuram Madhusudan, Grenoble (FR)

(73) Assignee: ORANGE, Paris (FR)

( * ) Notice: Subject to any disclaimer, the term of this patent is extended or adjusted under 35 U.S.C. 154(b) by 196 days.

(21) Appl. No.: 15/127,239

(22) PCT Filed: Mar. 27, 2015

(86) PCT No.: PCT/FR2015/050800
§ 371 (c)(1),
(2) Date: Sep. 19, 2016

(87) PCT Pub. No.: WO2015/145090
PCT Pub. Date: Oct. 1, 2015

(65) Prior Publication Data
US 2018/0176007 A1   Jun. 21, 2018

(30) Foreign Application Priority Data
Mar. 28, 2014 (FR) ...................... 1452760

(51) Int. Cl.
*H04L 9/08* (2006.01)
*H04L 9/30* (2006.01)
(52) U.S. Cl.
CPC .............. *H04L 9/0819* (2013.01); *H04L 9/08* (2013.01); *H04L 9/088* (2013.01); *H04L 9/0872* (2013.01); *H04L 9/0894* (2013.01); *H04L 9/30* (2013.01)

(58) Field of Classification Search
CPC ....... H04L 9/0819; H04L 9/08; H04L 9/0872; H04L 9/088; H04L 9/0894; H04L 9/30
See application file for complete search history.

(56) References Cited

U.S. PATENT DOCUMENTS 8,194,859 B2 * 6/2012 Wingert ................. G06F 21/10
380/286
8,595,498 B2 * 11/2013 Junod .................... G06F 21/445
713/170

(Continued)

FOREIGN PATENT DOCUMENTS

EP    2 381 615 A1   10/2011

OTHER PUBLICATIONS

Liu et al. 2003. Location-based pairwise key establishments for static sensor networks. *Proceedings of the First ACM workshop on Security of Ad Hoc and Sensor Networks. SASN 2003, Fairfax, VA.* New York: ACM. 11 pages.

(Continued)

*Primary Examiner* — Techane Gergiso
(74) *Attorney, Agent, or Firm* — Knobbe, Martens, Olson & Bear, LLP (57) ABSTRACT

Some embodiments relate to a data processing method comprising selecting a key from a plurality of previously stored keys, depending on at least on predefined criterion relating to at least one current value of at least one given repository. Other embodiments relate to a reception method comprising receiving second data obtained by applying, to first obtained data, a first cryptographic function using a key selected from a plurality of previously stored keys, depending on at least one predefined criterion relating to a current value of at least one given repository and for obtaining the first data by applying, to the second received data, a second cryptographic function using a second key associated with the selected key. Further embodiments relate to a processing (Continued)

device and a reception device that respectively implement the processing method and the reception method.

12 Claims, 6 Drawing Sheets

(56) References Cited

U.S. PATENT DOCUMENTS

| | | | |
|---|---|---|---|
| 8,892,865 B1* | 11/2014 | Roth | H04L 9/0822 713/150 |
| 2002/0169971 A1* | 11/2002 | Asano | G06F 21/10 713/193 |
| 2003/0003895 A1* | 1/2003 | Wallentin | H04L 63/08 455/410 |
| 2003/0023847 A1* | 1/2003 | Ishibashi | G06F 21/445 713/169 |
| 2004/0260927 A1* | 12/2004 | Grobman | H04L 9/0891 713/172 |
| 2005/0039136 A1* | 2/2005 | Othmer | G06Q 30/02 715/774 |
| 2005/0105735 A1* | 5/2005 | Iino | H04L 63/062 380/277 |
| 2006/0059561 A1* | 3/2006 | Ronning | G06F 21/10 726/26 |
| 2008/0037785 A1* | 2/2008 | Gantman | H04L 9/0872 380/259 |
| 2008/0170693 A1* | 7/2008 | Spies | G06F 21/6209 380/277 |
| 2009/0016524 A1* | 1/2009 | Park | H04W 8/26 380/44 |
| 2009/0144550 A1 | 6/2009 | Arunan | |
| 2010/0100972 A1* | 4/2010 | Lemieux | G06F 21/57 726/34 |
| 2011/0296513 A1* | 12/2011 | Kasad | G06F 21/35 726/9 |
| 2012/0201381 A1* | 8/2012 | Miller | H04L 9/16 380/255 |
| 2013/0070925 A1* | 3/2013 | Yamada | H04L 9/08 380/255 |
| 2013/0073871 A1* | 3/2013 | Kuno | G06F 12/14 713/193 |
| 2013/0251146 A1* | 9/2013 | Roelse | H04L 9/0825 380/210 |
| 2013/0254535 A1* | 9/2013 | Akehurst | H04L 29/06 713/158 |
| 2014/0003608 A1* | 1/2014 | MacMillan | H04L 9/0861 380/279 |
| 2014/0037087 A1* | 2/2014 | Tanaka | H04L 9/0838 380/44 |
| 2014/0310513 A1* | 10/2014 | Barney | H04L 63/0428 713/153 |
| 2015/0010151 A1* | 1/2015 | Roelse | H04N 21/26613 380/210 |
| 2015/0095648 A1* | 4/2015 | Nix | H04W 4/70 713/170 |
| 2015/0170209 A1* | 6/2015 | Smith | G06Q 30/02 705/14.64 |
| 2019/0158468 A1* | 5/2019 | Duong | H04L 9/0825 |

OTHER PUBLICATIONS

International Search Report dated Sep. 2, 2015 for International Application No. PCT/FR2015/050800 filed Mar. 27, 2015, 7 pages.
Written Opinion dated Sep. 2, 2015 for International Application No. PCT/FR2015/050800 filed Mar. 27, 2015, 6 pages.
Translation of the Written Opinion of the International Searching Authority dated Oct. 4, 2016 for International Application No. PCT/FR2015/050800 filed Mar. 27, 2015, 8 pages.

* cited by examiner

KEY SELECTION METHOD FOR CRYPTOGRAPHIC DATA PROCESSING

RELATED APPLICATIONS

This application is the U.S. National Phase of Application No. PCT/FR2015/050800 entitled "KEY SELECTION METHOD FOR CRYPTOGRAPHIC DATA PROCESSING" filed Mar. 27, 2015, which designated the United States, and which claims the benefit of French Application No. 1452760 filed Mar. 28, 2014.

The present invention relates to the field of access. It relates more particularly to access to data or access to a device or a building.

Many access systems are based on the knowledge of a same secret, for example a code or a cryptographic key, shared by different entities, or on associated pairs of cryptographic keys.

Data access systems include, for example, systems comprising first devices, such as, for example, sensors distributed over a geographical territory, capable of transmitting data confidentially to at least one second device. The data transmitted by a first device are encrypted by this first device with a known first key of this first device. Access to the data in the second device having received the data requires the knowledge of a second key associated with the first key.

Systems for controlling access by a plurality of users to rooms or parts of one or more buildings can also be mentioned. In these systems, users must present a code to a control device situated by each door to which access is controlled. The control device then checks the authenticity of the presented code and controls or does not control the opening of the door according to the result of the check.

For reasons of a change of operator, for example a change of manager of the second devices, or in order to increase security, it may be necessary to change the set of keys or the code used in these systems. This task may prove to be particularly costly when the control devices or the first devices are, on the one hand, numerous and geographically distributed and, on the other hand, do not have communication means capable of receiving a new key or a new code.

For example, a sensor connected to a second device via a wireless link, for example a radio link, may not, for reasons of energy constraints, have reception means.

Also, for example, a control device may not have communication means to communicate with a different device such as a server via a network.

The renewal of the keys or codes then requires the on-site visit of an operator.

One of the objects of the invention is to overcome these shortcomings/disadvantages of the prior art and/or make improvements thereto.

For this purpose, the invention proposes a data processing method carried out by a processing device, characterized in that it comprises a step of selecting a key from a plurality of previously stored keys according to at least one predefined criterion relating to a current value of at least one given reference.

A key is a cryptographic key or confidential information.

A cryptographic key is a secret or public key of a pair of cryptographic keys or a secret key.

Confidential information is a secret such as, for example, an access code.

A plurality of keys are previously stored in a memory of a processing device. This phase is implemented, for example, during the initialization of the device, for example during its on-site installation.

A key is selected from the stored keys according to one or more predefined criteria.

By means of the method, it is possible for a processing device carrying out the processing method to change keys without the need for it to have means for receiving a new key.

The keys are previously stored. They are preferably determined by a management device having processing capacities sufficiently large to generate robust keys.

Thus, the processing method is particularly suitable for processing devices having small processing capacities. The determination of the keys by a module other than the processing device allows the energy of the processing device to be saved.

A criterion is predefined in relation to at least one current value of at least one given reference. The current value changes either regularly or according to conditions, but, since the reference is known, it is possible for any system to know this current value.

The criterion advantageously also relates to at least one validity value associated with the key. One or more validity values are predefined for each stored key.

According to one particular embodiment of the method, a said criterion relates to a current date and to a validity period predefined for said key.

A current date is a current value that is simple to determine. It is thus simple for the processing device to know the current date.

The use of validity periods allows keys to be changed according to time.

A key is thus valid for only one or possibly more predefined periods. Outside these periods, it is unused.

When a single validity period is associated with a key, the key becomes obsolete when the period has elapsed. The use of a new key allows the security of the system to be increased.

A plurality of keys for different validity periods are previously stored. It is thus not necessary to take action on-site to store a new key when the preceding key is no longer valid. The method according to the invention allows a change of keys for devices which do not have means for receiving a new key, while avoiding action on the part of an operator.

According to one particular characteristic, said validity period of a key from the plurality of keys is defined by a first and a second value and the first and/or the second value is obtained from time information previously stored in association with said key from the plurality of keys.

The allocation of validity periods having different durations for each key allows the robustness of the system to be increased.

According to one particular embodiment of the processing method used alone or in combination with the preceding embodiment, a said criterion relates to a current geographical position and to a predefined positioning area associated with said key.

A plurality of keys for different geographical areas are previously stored. The key is selected according to the geographical position of the processing device carrying out the processing method. This embodiment is particularly suitable for systems including mobile processing devices.

According to one particular embodiment, the data processing method furthermore comprises a step of obtaining second data by applying a cryptographic function to obtained first data using the selected key and a step of sending said second data via a communication link.

This embodiment is particularly suitable for data access systems in which processing devices transmit data, for example measurement data, to a receiving device, and in which the data are transmitted in encrypted form for confidentiality reasons.

In telemetry systems, the management of the meters, which are processing devices, is generally entrusted to a company for a predefined period. At the end of this period, the management of these same meters may be entrusted to a different company. For confidentiality reasons, a new set of keys must be used so that the previous entity can no longer access the data. The acquisition of a new key by the new entity authorized to decrypt the data does not pose a problem since this entity has means for receiving a new key.

Conversely, the replacement of the key in each of the meters poses a problem. In fact, many of these sensors do not have means for receiving a new key, itself also sent in encrypted form, and/or does not have means for decrypting a key of this type. The change of keys in the meters then requires the on-site action of an operator in order to store a new key. The method according to the invention avoids the on-site action of an operator with each key change.

The mathematical function is, for example, a cryptographic function allowing the data to be encrypted by means of the selected key.

According to another particular embodiment, the data processing method furthermore comprises a step of obtaining second data by applying a mathematical function to obtained first data using the selected key and a step of sending or not sending a predetermined command according to the obtained second data.

This embodiment is particularly suitable for systems for accessing buildings or equipment when the devices carrying out the method are not connectable via a communication link.

The invention also relates to a data reception method, characterized in that it comprises the following steps implemented by a receiving device:
  receiving second data obtained by applying a first cryptographic function to obtained first data using a key selected from a plurality of previously stored keys according to at least one predefined criterion relating to a current value of at least one given reference;
  obtaining said first data by applying a second cryptographic function to said received second data using a second key associated with the selected key.

This method is particularly suitable for data access systems. A second key associated with the key selected by the processing device having transmitted the data is necessary in order to have access to the data to which the first cryptographic function is applied.

This second key is obtained by the receiving device using a conventional key acquisition method, for example following authentication with a management server. The obtaining of the second key is outside the field of the invention.

Only the entity holding the key used to encrypt the data can obtain these data.

Thus, in the case where the given reference is a time reference and the current value in this reference is a current date, in the event of a change occurring in the access system management, for example a change of manager of the receiving device, only the new manager having retrieved the second key will be able to access the decrypted data. The previous manager, holding the previous key only, will no longer be able to decrypt the data.

A first entity having received a key in order to decrypt the data received during a determined period will not be able to decrypt the data received during a different period, for example a following period, except in the case where it has obtained the key allowing the messages received during this other period to be decrypted.

The invention also relates to a data processing device, characterized in that it comprises a module for selecting a key from a plurality of previously stored keys according to at least one predefined criterion relating to a current value of at least one given reference.

The invention also relates to a measuring device capable of collecting measurement data, comprising:
  a module for selecting a key from a plurality of previously stored keys according to at least one predefined criterion relating to a current value of at least one given reference;
  a module for obtaining second data by applying a cryptographic function to collected first measurement data using the selected key;
  a module for transmitting a message containing the obtained second data.

The measuring device is an example of a processing device.

The invention also relates to a data-receiving device, comprising:
  a module for receiving second data obtained by applying a first cryptographic function to obtained first data using a key selected from a plurality of previously stored keys according to at least one predefined criterion relating to a current value of at least one given reference;
  a module for obtaining said first data by applying a second cryptographic function to said received second data using a second key associated with the selected key.

The invention also relates to a system comprising a receiving device as previously described and at least one processing device as previously described and capable of transmitting data messages to said receiving device via a wireless communication link.

According to one preferred implementation, the different steps of the method according to the invention are implemented by computer software or by a computer program.

The invention also relates to software or a program capable of being run by a computer or by a data processor, this software/program comprising instructions to control the execution of the steps of a data processing method and/or data reception method. These instructions are intended to be stored in a memory of a computing device, loaded then run by a processor of this computing device.

This software/program may use any programming language, and may be in the form of source code, object code or intermediate code between source code and object code, such as in a partially compiled form, or in any other desirable form.

The computing device may be implemented by one or more physically separate machines and has the overall architecture of a computer, including components of an architecture of this type: data memory/memories, processor(s), communication bus(es), hardware interface(s) for connecting this computing device to a network or other device, user interface(s), etc.

The invention also relates to an information medium readable by a data processor and comprising instructions of a program as mentioned above. The information medium may be any entity or device capable of storing the program.

Other characteristics and advantages of the present invention will become clear from the following description of an embodiment, given by way of non-limiting example, with reference to the attached drawings, in which.

The invention is implemented by means of software and/or hardware components. From this perspective, the term "module" may correspond in this document to either a software component, a hardware component or a set of hardware and/or software components capable of performing a function or a set of functions according to the description given below for the module concerned.

A software component corresponds to one or more computer programs, one or more subprograms of a program or, more generally, to any element of a program or software. A software component of this type is stored in a memory then loaded and run by a data processor of a physical entity (terminal, server, gateway, set-top box, router, etc.) and is capable of accessing hardware resources of this physical entity (memories, recording media, communication buses, electronic input/output cards, user interfaces, etc.).

Similarly, a hardware component corresponds to any element of a hardware assembly. It may be a hardware component that is programmable or has an integrated processor to run the software, for example an integrated circuit, a smart card, an electronic card to run firmware, etc.

A first embodiment of a processing method will now be described with reference to FIGS. 1 and 2.

Figure 1:
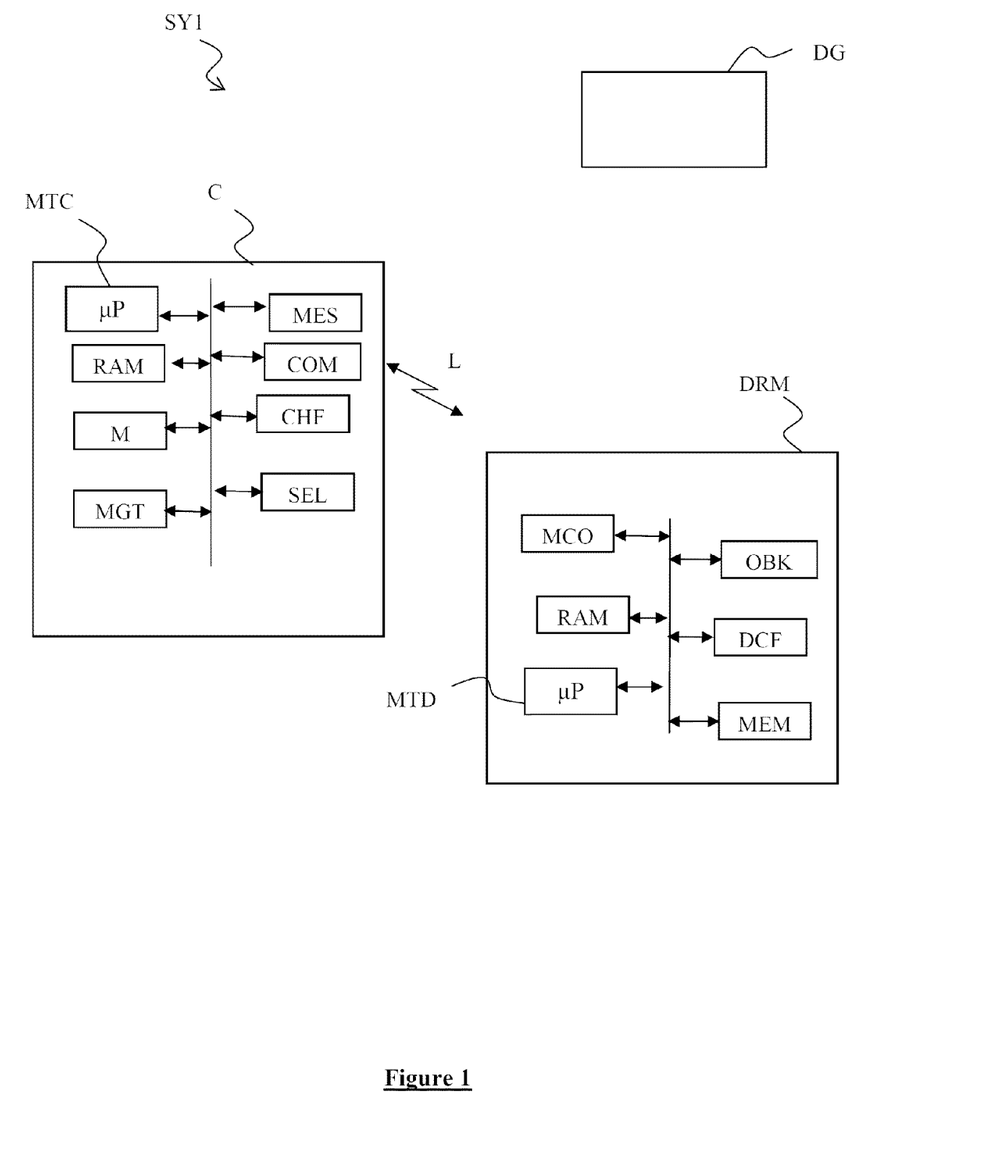
FIG. 1 is a diagram showing a system according to a first embodiment of the invention.
Figure 2:
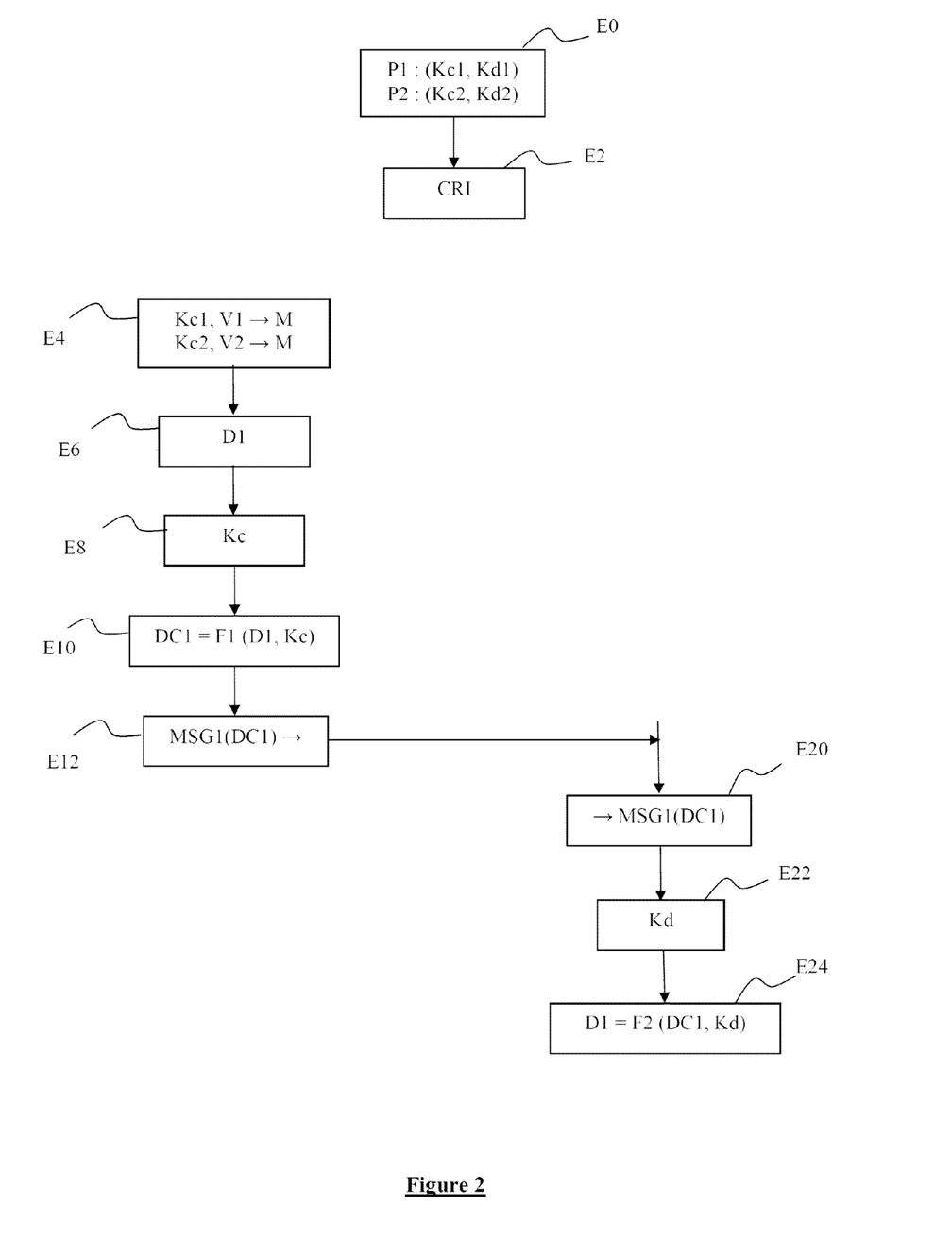
FIG. 2 is a flow diagram showing the different steps of a transmission method and a reception method according to a first embodiment of the invention.

With reference to FIG. 1, a system SY1 includes a receiving device DRM and a measuring device C capable of communicating with the receiving device DRM via a wireless communication link L, for example a radio link.

The measuring device C represents a processing device within the meaning of the invention.

In a known manner, the receiving device DRM comprises, in particular, a processing unit MTD equipped with a microprocessor, one or more storage memories MEM, for example EEPROM memories, and a random-access memory RAM.

In a conventional and non-exhaustive manner, the receiving device DRM may comprise the following elements: a keyboard, a display screen, a display module for the display on the display screen, a storage means, etc.

The receiving device DRM also comprises a communication module MCO capable of receiving data via the communication link L, a module OBK for obtaining a key and a decryption module DCF.

Alternatively, the communication module MCO of the measurement-receiving device DRM is also capable of transmitting data via the communication link L.

The storage memory MEM comprises registers storing a computer program comprising program instructions capable of carrying out a data reception method according to one embodiment of the invention described below with reference to FIG. 2.

The measuring device C is, for example, an electricity meter configured to measure the electrical consumption of a dwelling.

Alternatively, the measuring device C is a water meter, a gas meter, or a meter for measuring resources of a conurbation, such as irrigation, pollution, parking spaces, etc.

More generally, the measuring device C is a device capable of collecting data and transmitting them via a wireless communication link.

In a known manner, the measuring device C comprises, in particular, a processing unit MTC equipped with a microprocessor, a storage memory M, for example an EEPROM memory, and a random-access memory RAM.

The measuring device C also comprises a measuring module MES, a communication module COM, a key selection module SEL, an encryption module CHF and a management module MGT.

The measuring module MES is capable of obtaining a set of measurements performed regularly or otherwise.

A set of measurements includes one or more measurements.

The measuring module MES is capable, for example, of reading, on the one hand, a first meter indicating a number of kilowatts corresponding to a first period of a day, referred to as the "off-peak-hours period" and, on the other hand, a second meter indicating a number of kilowatts corresponding to a second period of the day, referred to as the "peak-hours period".

The communication module COM is capable of transmitting data via the communication link L.

Alternatively, the communication module COM is also capable of receiving data, for example parameters, via the communication link L.

Alternatively, the system SY1 comprises a plurality of measuring devices capable of respectively transmitting sets of measurements intended for the receiving device DRM.

Also, alternatively, a set of measurements transmitted by a first measuring device which is not located within range of the receiving device is forwarded via one or more measuring devices before reaching the receiving device DRM.

The storage memory M comprises registers storing a computer program comprising program instructions suitable for carrying out a data processing method according to one embodiment of the invention described below with reference to FIG. 2.

Alternatively, the system SY1 also comprises a collecting device capable of collecting the data transmitted by the measuring device(s) and transmitting the collected data to the receiving device DRM.

The system SY1 also comprises a management device DG.

One embodiment of a processing method and a reception method implemented in the system SY1 will now be described with reference to FIG. 2.

During a first preliminary step E0, the management device DG obtains a plurality of pairs of cryptographic keys. Each pair contains a first cryptographic key and a second cryptographic key associated with the first key.

For example, each pair of keys from the plurality of keys is a pair of symmetrical keys. In this case, the first key and the second key of each pair of keys are identical.

Alternatively, the first key is a public key and the second key is a private, or secret, key associated with the public key.

Two pairs of keys (Kc1, Kd1), (Kc2, Kd2), for example, are obtained.

The pairs of keys are generated by a key-generating module inserted into the management device DG or by an independent module capable of generating and transmitting the generated key pairs in a secure manner to the management device DG.

During a second preliminary step E2, a criterion CRI is predefined.

The criterion CRI relates to at least one current value of at least one given reference.

The reference is, for example, a time reference and the criterion CRI relates to the current date.

Alternatively, the criterion CRI relates to a current longitude value and a current latitude value. The reference is then defined in a geographical reference.

Also, alternatively, a reference is a temperature reference and a current value is a temperature value.

Also, alternatively, a current value is a status value of a device, for example "ON", "OFF", "fault detected", etc.

Also, alternatively, the criterion CRI relates to a current date and to a current geographical position, for example a GPS ("Global Positioning System") position.

Also, alternatively, a plurality of criteria are predefined.

The criterion CRI is also defined in relation to one or more validity values allowing validity ranges or areas to be defined.

In the embodiment described, a validity period PV is determined by each obtained pair of keys.

A validity period PV is defined by a validity start date and a validity end date or by a validity start date and a validity duration.

The validity start date, the validity end date and the validity duration represent validity values within the meaning of the invention.

In the embodiment described, the validity periods are consecutive in time and the set of periods form a predetermined time interval I.

The time interval I corresponds, for example, to the estimated maximum service life for the measuring device C, for example 15 years, or to the service life of a battery supplying this device, for example 5 years.

The duration of a validity period may be the same for each period or different for one or more periods.

During a third preliminary step E4, the first determined keys Kc1, Kc2 are obtained by the measuring device C and are stored in a memory of the measuring device C, for example the memory M. This step is implemented, for example, before the on-site installation of the measuring device C or during the on-site installation of the measuring device C or during the visit of an operator, for example a technician, to the site where the measuring device C is installed.

For this purpose, the first keys Kc1, Kc2 are transmitted, for example, in a secure manner to a portable device of the operator and are then transmitted from the portable device to the measuring device C. The portable device is, for example, a smart card or a "USB stick" ("Universal Serial Bus" in English) device.

Each first key Kc1, Kc2 is respectively stored in the memory M of the measuring device in association with time information V1, V2 allowing the measuring device C to determine a validity period for each key.

The time information is, for example, a validity start date or a validity end date.

Alternatively, the validity periods being consecutive, the time information is a validity end date.

Also alternatively, the validity periods being consecutive and having the same duration, no time information is stored in association with each first key. In this case, the cryptographic keys Kc1, Kc2 are stored in a predefined order.

During a step E6, the measuring module MES of the measuring device C collects measurement data D1.

The measurement data D1 represent first data.

During a step E8, the selection module SEL selects a first cryptographic key Kc from the stored first cryptographic keys Kc1, Kc2. The selection is made according to the criterion CRI.

In the embodiment described, the selection is made according to the current date and the validity period DV of the first key Kc.

The current date is an example of a current value of a given reference.

The selection is made according to a single criterion which is a criterion for comparing the current date with a validity period.

Alternatively, the selection is made according to a plurality of criteria, for example a first criterion for comparing a current date with validity dates, and a second criterion for comparing a current geographical position with one or more predefined geographical positions.

During a step E10, the encryption module CHF of the measuring device C obtains second data DC1 by applying a cryptographic function F1 to the first data D1. The cryptographic function F1 uses the key Kc selected during step E8 as a parameter.

During a step E12, the management module MGT of the measuring device C controls the transmission of a message MSG1 containing the obtained second data DC1 via the communication module COM and the communication link L.

The message MSG1 containing the second data DC1 is received by the communication module MCO of the receiving device DRM during a step E20.

During a step E22, the key-obtaining module OBK of the receiving device DRM obtains the second cryptographic key Kd associated with the first cryptographic key Kc. The second key Kd is, for example, obtained by reading a memory of a portable device of an operator. Such a portable device of the operator is, for example, a smart card or a "USB" stick capable of being connected to the receiving device DRM. In this case, the second key Kd has been obtained from the management device DG by the portable device and has been stored in the portable device during a preliminary procedure of storing the second key.

Alternatively, the second key Kd is transmitted by the management device DG to the measurement-receiving device DRM. The second key Kd is transmitted, for example, by the management device DG following the reception of a request for a second key transmitted by the receiving device DRM. It is transmitted, for example, during a secure procedure including a strong authentication procedure of the operator wishing to access the first data.

During a step E24, the decryption module DCF applies a second cryptographic function F2 to the received second data DC1. The second cryptographic function F2 uses the second key Kd obtained during step E22 as a parameter.

The decryption module DCF thus obtains the first data D1 initially collected by the measuring device C.

In the embodiment described, the cryptographic function F1 is an encryption function and the cryptographic function F2 is a decryption function.

The first cryptographic function F1 and the second cryptographic function F2 are respectively examples of mathematical functions.

The first function F1 and the second function F2 are such that $F2(F1(D1, Kc), Kd) = D1$ when Kc and Kd are associated keys.

Steps E4, E6, E8, E10 and E12 represent the steps of the processing method.

Steps E20, E22 and E24 represent the steps of the reception method.

A second embodiment will now be described with reference to FIGS. 3 and 4.

Figure 3:
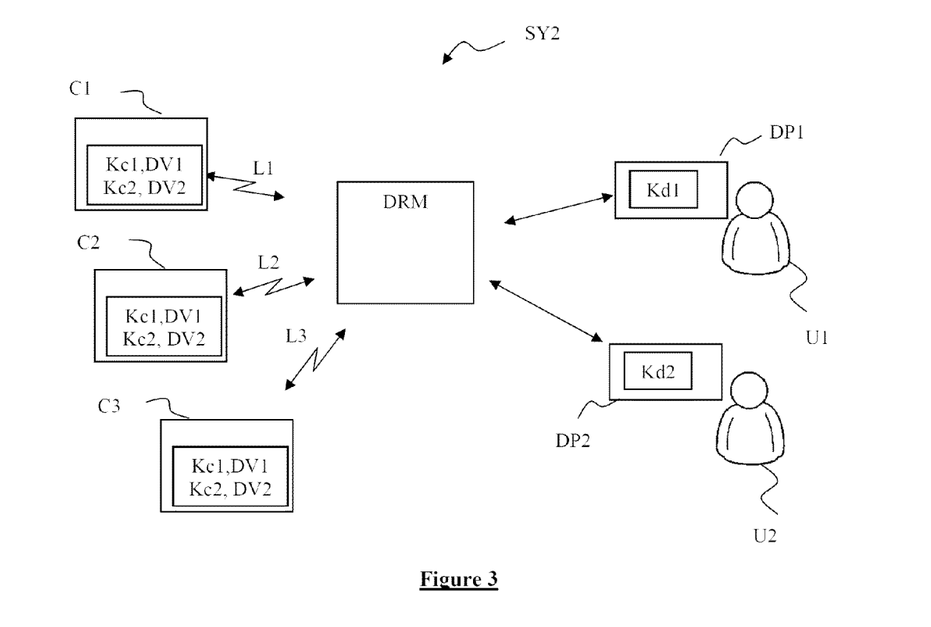
FIG. 3 is a diagram showing a system according to a second embodiment of the invention.

With reference to FIG. 3, a system SY2 includes a data-receiving device DRM and a plurality of measuring devices, for example three devices C1, C2 and C3.

A criterion CR1 is predefined. The criterion CR1 relates to the current date.

Pairs of cryptographic keys have previously been generated by a management device (not shown).

For example, two pairs of keys P1, P2 are generated.

The pair P1 contains a first key Kc1 and an associated second key Kd1.

The pair P2 contains a first key Kc2 and an associated second key Kd2.

A first validity period DV1 is associated with the pair P1. For example, the validity period DV1 starts on a date D0 and ends on a date D1.

The dates D0 and D1 represent validity values defining the validity period DV1.

A second validity period DV2 is associated with the pair P2. For example, the validity period DV2 starts on a date D2 and ends on a date D3. The date D2 corresponds, for example, to the day following the date D1 (D2=D1+"one day").

The dates D2 and D3 represent validity values defining the validity period DV2.

The first keys Kc1, Kc2 of the pairs of keys P1, P2 thus generated and validity values defining the validity periods DV1, DV2 associated with each pair of keys P1, P2 have been stored in a memory of each measuring device C1, C2, C3, during a previous step.

The second key Kd1 is supplied to a first user U1. For example, the second key Kd1 is stored in a secure memory area of a portable device DP1 of the user U1.

At first current times T1, T2 . . . , included between the dates D0 and D1, the measuring device C1 transmits data messages M1, M2 . . . . Each transmitted message M1, M2 . . . includes measurement data encrypted with the first key Kc1. In fact, the first times T1, T2 represent current dates and the key selected from the keys stored as a function of the criterion CR1 is the key Kc1.

The encrypted measurement data are obtained by applying a cryptographic function to the measurement data. The cryptographic function uses the key Kc1 as a parameter.

At first current times T3, T4, T5 . . . , included between D0 and D1, the measuring device C2 transmits data messages M3, M4, M5 . . . . Each transmitted message M3, M4, M5 . . . includes measurement data encrypted with the first key Kc1.

At a first current time T6, included between D0 and D1, the measuring device C3 transmits a data message M6. The message M6 includes measurement data encrypted with the first key Kc1.

Figure 4:
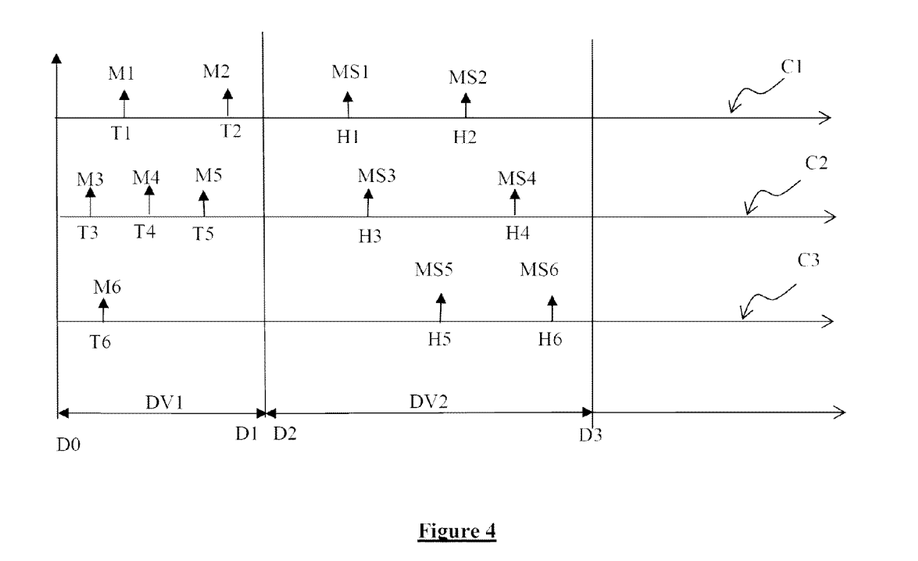
FIG. 4 is a timing diagram showing the sending of messages by a processing device.

FIG. 4 is a timing diagram showing the current times T1, T2 . . . T6 at which the messages M1, M2 . . . M6 are sent.

The messages M1, M2, M3 . . . M6 are received by the receiving device DRM.

The user U1 accesses the measurement-receiving device DRM and controls the decryption of the received data.

The data-receiving device DRM obtains the second key Kd1 by accessing the secure memory area of the portable device DP1 of the user U1.

The measurement data collected by the measuring devices C1, C2 C3 are obtained by the receiving device DRM by applying a cryptographic function to the data received in the messages M1, M2 . . . M6 using the key Kd1 as a parameter.

At second current times H1, H2 . . . , included between the dates D2 and D3, the measuring device C1 transmits data messages MS1, MS2 . . . Each transmitted message MS1, MS2 . . . includes measurement data encrypted with the first key Kc2.

In fact, the current times H1, H2 . . . being included between the dates defining the second validity period DV2, the key selected according to the criterion CR1 is the key Kc2.

At second current times H3, H4 . . . , included between the dates D2 and D3, the measuring device C2 transmits data messages MS3, MS4 . . . Each transmitted message MS3, MS4 . . . includes measurement data encrypted with the first key Kc2.

At second current times H5, H6 . . . included between the dates D2 and D3, the measuring device C3 transmits data messages MS5, MS6 . . . Each message MS5, MS6 . . . includes measurement data encrypted with the first key Kc2.

The timing diagram shown in FIG. 4 also shows the current times H1, H2 . . . H6 at which the messages MS1, MS2 . . . MS6 are sent.

The messages MS1, MS2, MS3 . . . MS6 are received by the receiving device DRM.

A user U2 accesses the measurement-receiving device DRM and controls the decryption of the received data.

The second key Kd2 has been previously communicated to the user U2. For example, the second key Kd2 is stored in a secure memory area of a portable device DP2 of the user U2.

The data-receiving device DRM obtains the second key Kd2 by accessing the secure memory area of the portable device DP2 of the user U2.

The measurement data collected by the measuring devices C1, C2 C3 are obtained by the receiving device DRM by applying a cryptographic function to the data received in the messages MS1, MS2 . . . MS6 using the key Kd2 as a parameter.

In the case where the user U1 accesses the measurement-receiving device DRM and controls the decryption of the data, the data-receiving device DRM obtains the second key Kd1 by accessing the portable device DP1 of the user U1.

Data are then obtained by the measurement-receiving device DRM by applying a cryptographic function to the data received in the messages MS1, MS2 . . . MS6 using the key Kd1 as a parameter. These data are not the measurement data collected by the measuring devices C1, C2, C3 since the key Kd1 stored in the portable device DP1 of the user U1 is not the key associated with the key Kc2 that was used to encrypt the measurement data. The user U1 cannot therefore access the measurement data.

A third embodiment will now be described with reference to FIG. 5.

Figure 5:
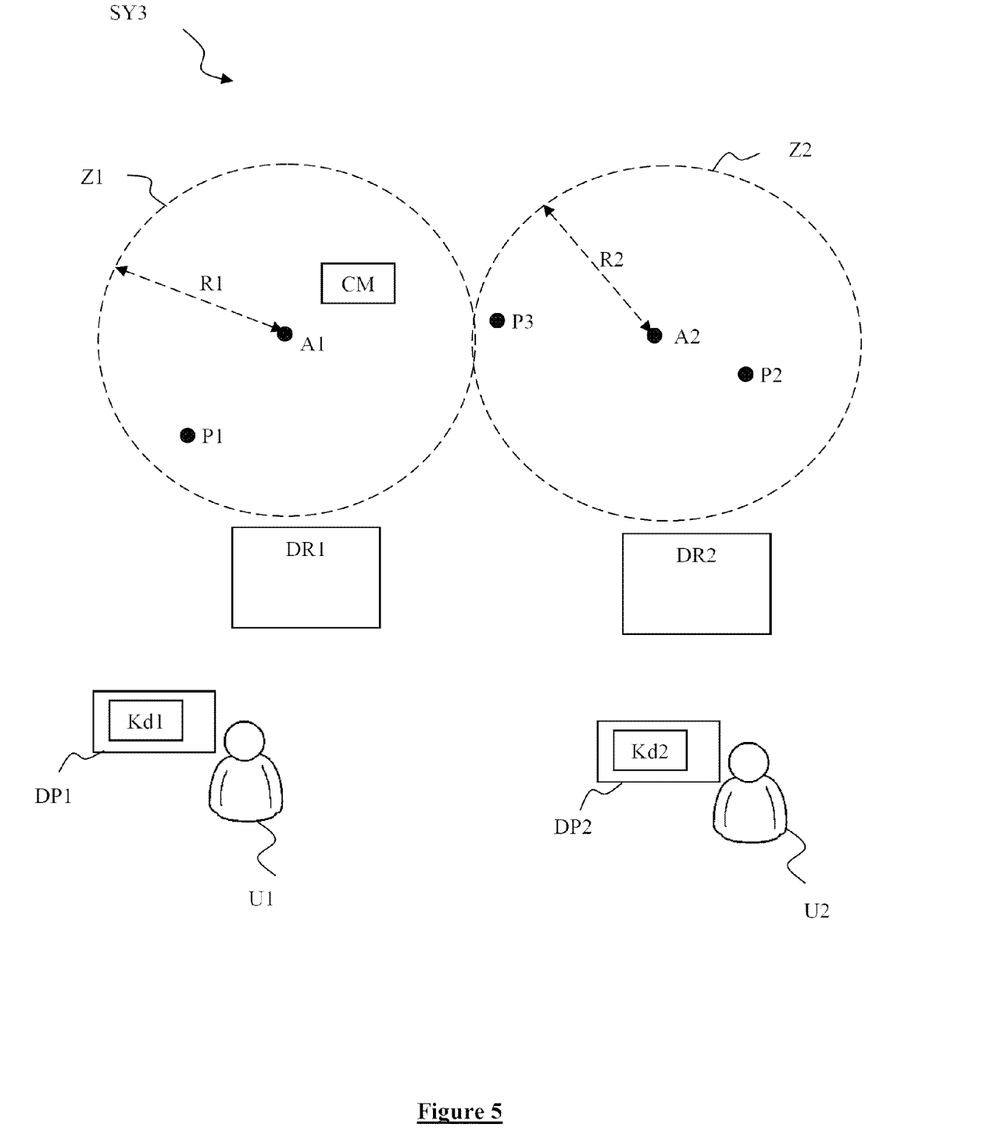
FIG. 5 is a diagram showing a system according to a third embodiment of the invention.

FIG. 5 shows a system SY3 including a measuring device CM and two receiving devices DR1 and DR2.

The measuring device CM is a mobile device. It is capable of collecting measurement data, for example data relating to ambient air quality. It is also capable of transmitting data messages via a wireless link, for example a radio link.

The measuring device CM represents a data processing device within the meaning of the invention.

Alternatively, the system SY3 includes a plurality of measuring devices.

A criterion CR2 is predefined. The criterion CR2 relates to a current geographical position of the measuring device CM.

The current geographical position is defined, for example, by the GPS ("Global Positioning System") coordinates.

Alternatively, the current geographical position is defined in a different reference.

The first receiving device DR1 is located close to a first geographical area Z1 and the second receiving device DR2 is located close to a second geographical area Z2.

The geographical area Z1 is, for example a circular area defined by a position of a central point A1 and by a radius R1.

The geographical area Z2 is, for example a circular area defined by a position of a central point A2 and by a radius R2.

Alternatively, the area Z1 and/or the area Z2 is a non-circular area, for example a rectangular or oval area, or an area defined by two latitude values and/or two longitude values.

Also, alternatively, the shape of the area Z1 is different from the shape of the area Z2.

The measuring device CM is capable of moving in the geographical areas Z1 and Z2.

Pairs of cryptographic keys have been previously generated by a management device (not shown).

For example, two pairs of keys P1, P2 are generated.

The pair of keys P1 contains a first key Kc1 and an associated second key Kd1.

The pair of keys P2 contains a first key Kc2 and an associated second key Kd2.

One or more values identifying the first area Z1 are associated with the pair P1. For example, the values identifying the area Z1 are GPS ("Global Positioning System") coordinates of the central point A1 and a value defining the radius R1 of the area Z1. One or more values identifying the first area Z2 are associated with the pair P2. For example, the values identifying the area Z2 are GPS ("Global Positioning System") coordinates of the central point A2 and a value defining the radius R2 of the area Z2.

The values identifying the area Z1 and the area Z2 respectively represent validity values associated with the key Kc1 and with the key Kc2 respectively.

The criterion CR2 is defined by "the selected key is the key associated with the area where the measuring device CM is located".

The first keys Kc1, Kc2 of the generated pairs of keys P1, P2 and the values identifying the areas Z1, Z2 associated with each pair of keys P1, P2 have been stored in a memory of the measuring device CM during a preliminary step.

The second key Kd1 is supplied to a first user U1 of the first receiving device DR1. For example, the second key Kd1 is stored in a secure memory area of a portable device DP1 of the user U1.

The second key Kd2 is supplied to a second user U2 of the second receiving device DR2. For example, the second key Kd2 is stored in a secure memory area of a portable device DP2 of the user U2.

At a first current time T1, the measuring device CM is at a current position P1 in the area Z1 and obtains measurement data DM1.

The measuring device CM selects a key K from the keys stored in the measuring device CM.

The key K is selected according to the criterion CR2. The current geographical position of the device CM being a position of the area Z1, the selected key K is the key Kc1.

The measuring device CM then obtains second data DS1 by applying a first cryptographic function F1 to the first data DM1 and transmits a data message containing the second data DS1 via the radio communication link.

The data message is received by the first receiving device DR1.

The user U1 accesses the receiving device DR1 and controls the decryption of the received data.

The first receiving device DR1 obtains the second key Kd1 by accessing the secure memory area of the portable device DP1 of the user U1.

The measurement data DM1 collected by the measuring device CM are obtained by the receiving device DR1 by applying a second cryptographic function F2, associated with the first cryptographic function F1, to the received second data DS1 and using the key Kd1 as a parameter.

At a second current time T2, the measuring device CM is at a current position P2 and collects measurement data DM2. The position P2 is a position of the area Z2.

The measuring device CM selects a key K from the keys stored in the device CM.

The key K is selected according to the criterion CR2. The current geographical position of the measuring device CM being a position of the area Z2, the selected key K is the key Kc2.

The measuring device CM then obtains second data DS2 by applying the first cryptographic function F1 to the first data DM2 and transmits a data message containing the second data DS2 via the radio communication link.

The data message is received by the second receiving device DR2.

The user U2 accesses the receiving device DR2 and controls the decryption of the received data.

The receiving device DR2 obtains the second key Kd2 by accessing the secure memory area of the portable device DP2 of the user U2.

The measurement data collected by the measuring device CM, i.e. the first data DM2, are obtained by the receiving device DR2 by applying the second cryptographic function F2 to the received second data DS2 using the key Kd2 as a parameter.

At a third current time T3, the measuring device CM is at a current position P3 and collects measurement data DM3. The position P3 is a position of the area Z2.

The measuring device CM selects a key K from the keys stored in the measuring device CM.

The key K is selected according to the criterion CR2. The current geographical position P3 of the measuring device CM being a position of the area Z2, the selected key K is the key Kc2.

The measuring device CM then obtains second data DS3 by applying the first cryptographic function F1 to the first data DM3 and transmits a data message containing the second data DS3 via the radio communication link.

The data message is received, on the one hand, by the first receiving device DR1 and, on the other hand, by the second receiving device DR2 since the measuring device CM is located in the radio field of the two devices DR1 and DR2.

The user U2 accesses the receiving device DR2 and controls the decryption of the received data.

The receiving device DR2 obtains the second key Kd2 by accessing the secure memory area of the portable device DP2 of the user U2.

The measurement data collected by the measuring device CM, i.e. the first data DM3, are obtained by the receiving device DR2 by applying the second cryptographic function F2 to the received first data DM3 using the key Kd2 as a parameter.

The user U1 accesses the receiving device DR1 and controls the decryption of the received data.

The receiving device DR1 obtains the second key Kd1 by accessing the secure memory area of the portable device DP1 of the user U1.

Data DF are obtained by the receiving device DR1 by applying the second cryptographic function F2 to the received first data DM3 using the key Kd1 as a parameter. Since the key Kd1 is not the key associated with the key Kc2 used by the first function F1, the obtained data DF do not correspond to the measurement data DM3.

A fourth embodiment in which the keys are access codes will now be described with reference to FIGS. 6 and 7.

Figure 6:
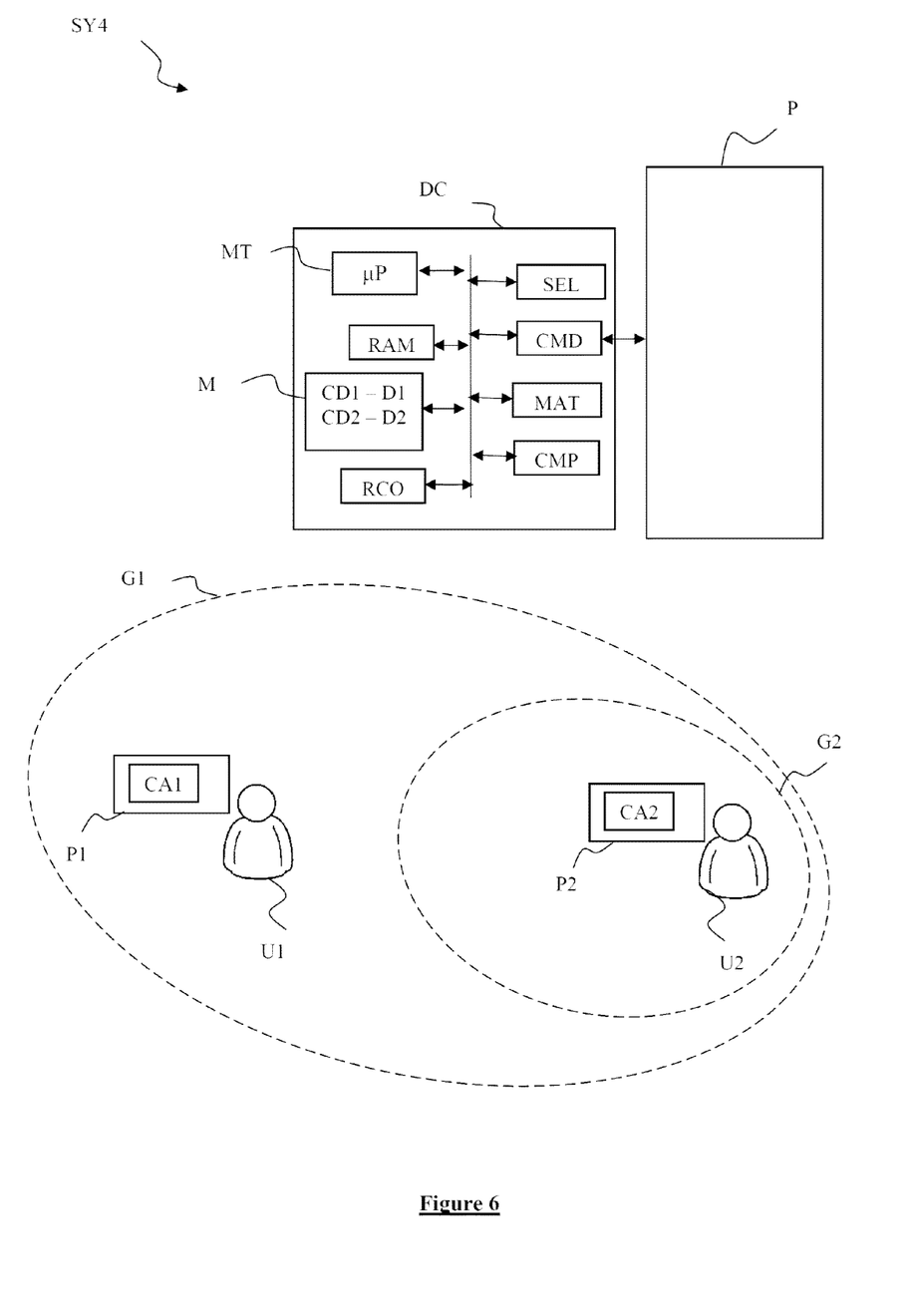
FIG. 6 is a diagram showing a system according to a fourth embodiment of the invention.
Figure 7:
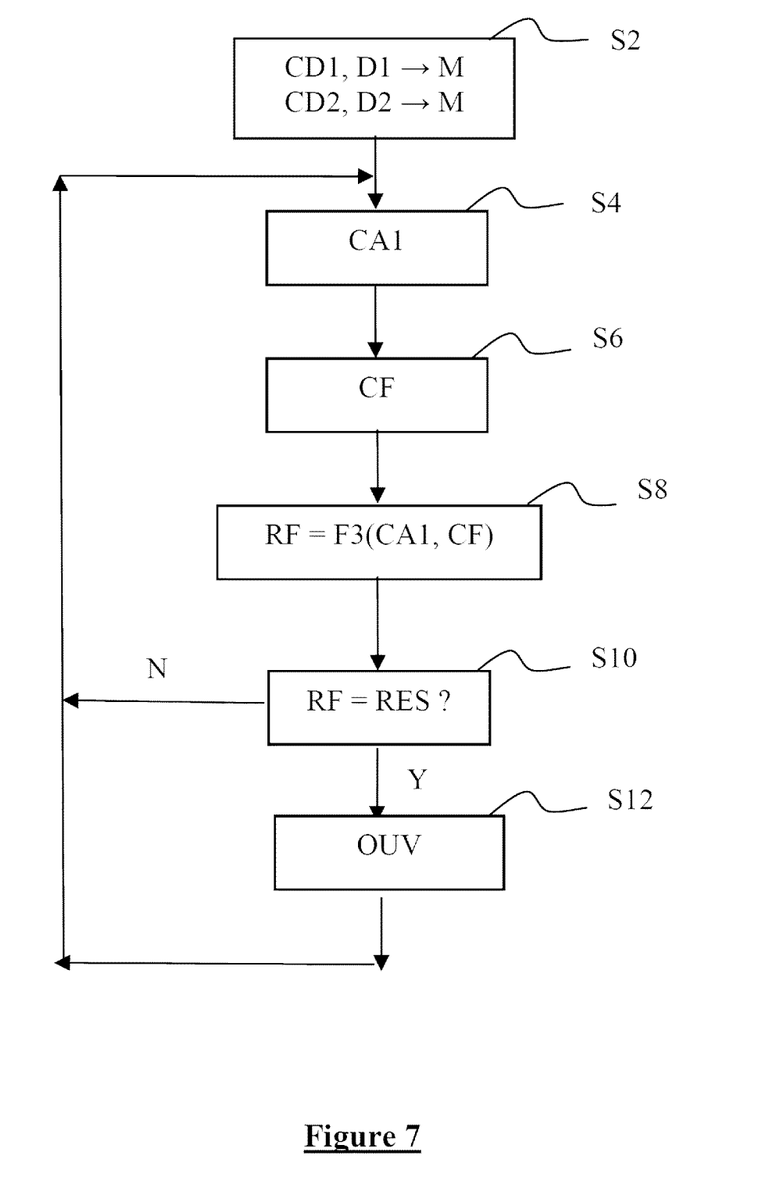
FIG. 7 is a flow diagram showing the different steps of a transmission method according to a fourth embodiment of the invention.

FIG. 6 shows a system SY4 including a control device DC connected to a door P of a building.

The control device DC represents a processing device within the meaning of the invention.

Alternatively, the system SY4 includes a plurality of control devices connected respectively to a plurality of doors.

The control device DC is, for example, a terminal and comprises, in a known manner, in particular a processing unit MT equipped with a microprocessor, a storage memory M and a random-access memory RAM.

The control device DC may comprise, in a conventional and non-exhaustive manner, the following elements: a keyboard, a display screen, a display module for the display on the display screen, etc.

The control device DC also comprises a code-obtaining module RCO, a selection module SEL, a computing module MAT, a comparison module CMP and a control module CMD.

The control module CMD is capable of controlling the opening of the door P.

The storage memory M comprises registers storing a computer program comprising program instructions suitable for carrying out a data processing method according to one embodiment of the invention described below with reference to FIG. 7.

An embodiment of the processing method carried out by the control device DC will now be described with reference to FIG. 7.

During a preliminary phase, access codes are determined. For example, two access codes CD1 and CD2 are determined.

A first validity period DV1 is associated with the first access code CD1. For example, DV1 starts on a date D0 and ends on a date D1.

A second validity period DV2 is associated with the second access code CD2. For example, DV2 starts on the date D1 and ends on a date D2.

The dates D0, D1 and D2 are expressed, for example, as day/month/year/hour.

During a preliminary step S2, the first access code CD1 is stored in association with the validity end date D1 in the memory M of the control device DC, for example during the on-site installation of the control device DC.

The second access code CD2 is also stored in association with the validity end date D2 in the memory M of the control device DC.

Furthermore, also during a preliminary phase, an access code CA1 is communicated to each user from a first group of users G1.

In this embodiment, the access code CA1 is the first access code CD1 stored in the control device DC.

The first group of users G1 is, for example, the group of employees of a company at a first predefined time, for example at the time of the communication of the access code CA1.

The group G1 includes, for example, a first user U1 and a second user U2.

More precisely, the access code CA1 is stored in a memory of a portable device P1, P2 . . . of each user U1, U2 . . . of the group of users G1.

The portable device is, for example, a memory card of the smart card type or any other type of medium allowing data storage.

Alternatively, the first access code CA1 is communicated to each user of the first group G1 in a letter, an email message, an SMS ("Short Message Service") message or any other form of communication.

At a first current time T1 included between the dates D0 and D1, the user U1 of the group G1 having obtained the access code CA1 stands in front of the control device DC and supplies his access code CA1 to the control device DC.

The code CA1 is obtained by the code-obtaining module RCO of the control device DC during a step S4.

During a step S6, the selection module SEL of the control device DC selects an access code CF from the access codes CD1, CD2 stored in the memory M. The access code CF is selected by applying a predefined criterion CR4 relating to a current date.

The criterion CR4 applied in this embodiment is that the selected access code CF is the access code associated with the validity end date closest to the current date from the validity end dates stored in the memory M which occur after the current date.

Since D1 is the validity end date closest to the current date T1 from the validity end dates D1 and D2 and D1 occurs after the current date T1, the selected access code CF is the first access code CD1.

Step S6 is followed by a step S8 during which the computing module MAT of the control device DC obtains second data RF by applying a mathematical function F3 using the selected access code CF to the access code CA1 supplied to the control device DC by the user U1.

The mathematical function F3 is, for example, a function of subtraction of the access code CA1 and of the selected access code CF.

Then, during a step S10, the comparison module CMP of the control device DC compares the obtained second data RF with a predetermined result value RES. In the case where the mathematical function F3 is a function of subtraction of the access code CA1 and of the selected access code CF, the result value RES is, for example, the value 0.

In the case where the obtained second data RF are identical to the predetermined result value RES, a command OUV to open the door is transmitted by the control module CMD of the control device DC to the door P during a step S12 and the user U1 can pass through the door P.

Step S12 is followed by a new step S4 when a new user presents his access code to the control device DC.

In the case where the obtained second data RF are not identical to the predetermined result value RES, step S12 is not implemented and step S10 is followed by a new step S4 when a new user presents his access code to the control device DC.

Subsequently, an access code CA2 is transmitted to a second group G2 of users.

The group of users G2 is, for example, the group of employees of a company at a second predefined time, for example at the time of the handover of the access code CA2.

For example, the group G2 includes the user U2 but does not include the user U1.

At a second current date H1, included between the dates D1 and D2, the user U2 stands in front of the control device DC and supplies his access code CA2 to the control device DC.

The control device DC selects an access code CF from the stored access codes. The access code is selected by applying the criterion CR4.

Since D2 is the validity end date closest to the current date H2 from the validity end dates occurring after the current date H2, the selected access code CF is the second access code CD2.

Second data RF2 are obtained by applying the mathematical function F3 using the selected access code CF, to the access code CA2 supplied to the control device DC by the user U2.

The obtained second data RF2 are then compared with the result value RES.

Since the obtained second data RF2 are equal to the result value RES, a command OUV to open the door is transmitted by the control module CMD of the control device DC to the door P and the user U2 can pass through the door P.

At a third current date H3, included between the dates D1 and D2, the user U1 stands in front of the control device DC and supplies his access code CA1 to the control device DC.

The control device DC selects an access code CF from the stored access codes. The access code is selected according to the criterion CR4.

Since D2 is the validity end date closest to the current date H3 from the validity end dates which occur after the current date H3, the selected access code CF is the second access code CD2.

Second data RF3 are obtained by applying the mathematical function F3 using the selected access code CF to the access code CA1 supplied to the control device DC by the user U1.

The obtained second data RF3 are then compared with the result value RES.

Since the obtained second data RF3 are different from the result value RES, the control device DC does not control the opening of the door.

Steps S2, S4, S6, S8 and S10 represent the steps of the processing method.

In the embodiment described, the codes CA1, CA2 transmitted to the users are identical to the access codes CD1, CD2, or keys, stored in the memory M of the control device DC.

Alternatively, an access code transmitted to the users is obtained by applying a first mathematical function, for example a cryptographic function, to the access code intended to be stored in the memory of the control device. The access code transmitted to the users represents first data within the meaning of the invention. During the control phase, second data are obtained by applying a second mathematical function to the first data and are then compared to the selected access code. According to the result obtained following the comparison, the control device DC controls or does not control the opening of the door.

The invention claimed is:

1. A data processing method carried out by a processing device, the processing device comprising a memory in which a plurality of keys have been previously stored respectively in association with at least one validity value, the plurality of keys comprising at least three keys, the processing device configured to receive or transmit data via a communication link, the method comprising:
   obtaining first data, the first data being collected by the processing device or received by the processing devices; and
   determining second data by applying a function to the first data, the function using a key of the plurality of keys, wherein the key is selected from among the plurality of previously stored keys, as a function of at least one criterion of comparison of at least one current value of at least one given reference and the validity values stored in association with the plurality of keys, the current value being a current date, a position of the processing device, or a current temperature, the at least one criterion relating to the current date and to a validity period predefined for the key.

2. The data processing method of claim 1, in which said validity period of a key from the plurality of keys is defined by a first and a second value and in which the first and/or the second value is obtained from time information previously stored in association with said key from the plurality of keys.

3. The data processing method of claim 1 wherein said at least one criterion relates to a current geographical position and to a predefined positioning area associated with said key.

4. The data processing method of claim 1, wherein determining second data comprises applying a cryptographic function to obtained first data using the selected key, the method further comprising sending the second data via the communication link.

5. The data processing method of claim 1, wherein determining second data comprises applying a mathematical function to obtained first data using the selected key and sending or not sending a predetermined command according to the obtained second data.

6. The data processing method of claim 1, wherein the plurality of keys are generated by a key generation device different from the processing device, the key generation device configured to transmit a key associated with a generated key of the plurality to a reception device, the transmitted key being selected by the key generation device according to at least one criterion relating to at least one current value of at least one given reference and to at least one validity value associated to said key.

7. A data reception method implemented by a receiving device, the method comprising:
   receiving second data obtained by applying a first cryptographic function to obtained first data using a key selected from among a plurality of previously stored keys, the plurality of previously stored keys comprising at least three keys, wherein the key is selected as a function of at least one criterion of comparison of a current value of at least one given reference and validity values stored in association with the plurality of keys, the current value being a current date, a position of the processing device, or a current temperature, the at least one criterion relating to the current date and to a validity period predefined for the key; and
   obtaining the first data by applying a second cryptographic function to the received second data using a second key associated with the selected key.

8. A data processing device comprising a memory in which a plurality of keys have been previously stored respectively in association with at least one validity value, the plurality of keys comprising at least three keys, the processing device configured to receive or transmit data via a communication link, the data processing device configured to:
- obtain first data, the first data being collected by the processing device or received by the processing device; and
- determine second data by applying a function to the first data, the function using a key of the plurality of keys, wherein the key is selected from among the plurality of previously stored keys, as a function of at least one criterion of comparison of at least one current value of at least one given reference and the validity values stored in association with the plurality of keys, the current value being a current date, a position of the processing device, or a current temperature, the at least one criterion relating to the current date and to a validity period predefined for the key.

9. A measuring device capable of collecting measurement data, the measuring device comprising a memory in which a plurality of keys have been previously stored respectively in association with at least one validity value, the plurality of keys comprising at least three keys, the measuring device configured to receive or transmit data via a communication link, wherein the measuring device is configured to:
- collect first measurement data;
- select a key from among the plurality of previously stored keys as a function of at least one criterion of comparison of at least one current value of at least one given reference and the validity values stored in association with the plurality of keys, the current value being a current date, a position of the processing device, or a current temperature, the at least one criterion relating to the current date and to a validity period predefined for the key;
- obtain second data by applying a cryptographic function to the collected first measurement data using the selected key; and
- transmit a message containing the obtained second data.

10. A data-receiving device comprising a processor and a memory, the data-receiving device configured to:
- receive second data obtained by applying a first cryptographic function to obtained first data using a key selected from among a plurality of previously stored keys, the plurality of keys comprising at least three keys, the key being selected as a function of at least one criterion of comparison of at least one current value of at least one given reference and validity values stored in association with the plurality of keys, the current value being a current date, a position of the processing device, or a current temperature;
- the at least one criterion relating to the current date and to a validity period predefined for the key, and
- obtain the first data by applying a second cryptographic function to the received second data using a second key associated with the selected key.

11. A non-transitory computer readable medium having stored thereon instructions, which when executed by a processor of a processing device, cause the processing device to perform a data processing method, the processing device comprising a memory in which a plurality of keys have been previously stored respectively in association with at least one validity value, the plurality of keys comprising at least three keys, the processing device configured to receive or transmit data via a communication link, the method comprising:
- obtaining first data, the first data being collected by the processing device or received by the processing devices; and
- determining second data by applying a function to the first data, the function using a key of the plurality of keys, wherein the key is selected from among the plurality of previously stored keys, as a function of at least one criterion of comparison of at least one current value of at least one given reference and the validity values stored in association with the plurality of keys, the current value being a current date, a position of the processing device, or a current temperature, the at least one criterion relating to the current date and to a validity period predefined for the key.

12. A processing device comprising a memory in which a plurality of keys have been previously stored respectively in association with at least one validity value, the plurality of keys comprising at least three keys, the processing device configured to receive or transmit data via a communication link, the processing device having stored in the memory of the processing device instructions which, when executed by said computer, cause said processing device to perform the method of claim 1.

* * * * *